United States Patent [19]

Causey et al.

[11] 4,207,675
[45] Jun. 17, 1980

[54] ADJUSTABLE UTILITY EXTENSION HANDLE FOR ELECTRICALLY POWERED HANDTOOL

[76] Inventors: Warren L. Causey, 2468 Lorna Dr.; Harvey P. Yeager, 620 Cheyenne Ave.; Clarence Burchell, 125 Squire Dr., all of Melbourne, Fla. 32935

[21] Appl. No.: 905,400

[22] Filed: May 15, 1978

[51] Int. Cl.² ............................................. B27B 17/02
[52] U.S. Cl. ................................. 30/296 R; 30/381
[58] Field of Search ................... 30/122, 166, 296 R, 30/379, 381, 382, 276, 388, 390, 500; 310/50

[56] References Cited

U.S. PATENT DOCUMENTS

| | | | |
|---|---|---|---|
| 2,730,803 | 1/1956 | Kimball | 30/296 X |
| 3,688,139 | 8/1972 | Yaguchi | 30/388 X |
| 3,949,817 | 4/1976 | Rice | 30/381 |

Primary Examiner—Jimmy C. Peters
Attorney, Agent, or Firm—Richard D. Dixon

[57] ABSTRACT

The present invention relates to an adjustable utility extension handle for a small electrically powered handtool. An elongated support pole is provided having a first handle coupled to a lower end thereof for being grasped by the operator to provide a first manual support point. A second handle is movably mounted along the pole for providing a second manual support point. The first handle includes a power regulating device which is interposed along an electrical conductor which supplies electrical power to the power handtool, thereby allowing the operator at the lower end of the elongated support pole to regulate the speed of the power handtool.

A tool coupler is removably attached to the power handtool. The tool coupler includes an actuator for engaging and fully actuating any electrical power control which regulates the operation of the power handtool. A positioning device is operably coupled to the second end of the support pole and to the tool coupler for regulating the operative angular position therebetween. In this manner the operator may set the required operative angular position of the power handtool adjacent the second end of the support pole, and then may electrically control the operation of the power handtool from the first handle when the power handtool is elevated to an extended operating position.

12 Claims, 3 Drawing Figures

ADJUSTABLE UTILITY EXTENSION HANDLE FOR ELECTRICALLY POWERED HANDTOOL

BACKGROUND OF THE INVENTION

I Field of the Invention

The present invention is related to the device for extending the reach of an electrically powered handtool, such as an electrically powered chainsaw. More particularly, the present invention relates to a device in which the electrically powered handtool is interchangeably coupled to and adjustably movable upon a distended end of an elongated support pole.

II Description of the Prior Art

As the cost of electrically powered handtools decreases, more homeowners and businesmen are investing in labor saving devices such as chainsaws, power sanders, power sprayers, power hedge trimmers, power sabre saws, power buffers, and various other lightweight power tools. However, as Federal and State clean air and noise standards are further restricted, the manufacturers of these light-weight power handtools are continually being encouraged to switch from internal combustion engines of various types to electric motors for providing power to these handtools. Furthermore, the relatively escalating costs of producing internal combustion engines as compared with the cost of producing and maintaining an electrical motor strongly indicates to the tool designer that his product may be more economically competitive by utilizing readily available electrical power and compatible electrical components.

The present invention is specifically designed to allow the owner of a large number of these electrically powered handtools to interchangeably couple each of the tools to a distended end of an elongated support pole for allowing the electrically powered handtool to be used at elevations and horizontal distances which have heretofore forced the operator to utilize precarious and unsafe means for placing himself and the electrically powered handtool adjacent the work area. By providing an interchangeable support which will accommodate a large number of electrically powered handtools, and by making each of these handtools, regardless of their nature, controllable from the lower support end of the elongated support pole, the owner will be able to more efficiently and effectively utilize the electrically powered handtools which he already owns.

Various prior art inventors have attacked this problem through a plurality of diversified methods. For example, Yaguchi, in U.S. Pat. No. 3,688,139, discloses an electrically powered rotary disc saw which is attached to a distended end of a support pole which includes an electrical control and support handle adjacent the lower end thereof. This design does not provide for the interchangeable use of a large number of diversified electrically powered handtools, nor does the device provide for the custom orientation of the angle included between the electrically powered handtool and the elongated support pole which is typically required in order to facilitate the proper utilization of the various handtools which may be coupled thereto.

Rice, in U.S. Pat. No. 3,949,817 discloses an elongated support pole which includes at a distended end thereof a plate for removeably coupling with a powered chainsaw. The invention includes a mechanically extended and remotely controlled trigger element which adjustably depresses the power trigger on the chainsaw. Again, no provisions are included for adjusting the operative angle between the support pole and the handtool as well as controlling handtools which do not include the power trigger at the specific location required by the Rice apparatus.

Carnesecca, in U.S. Pat. No. 3,343,613, discloses a hydraulically operated chainsaw which is moveably mounted adjacent an extended support pole. The chainsaw is moveably mounted so as to allow the operator by complex adjustment techniques to vary the operative position of the chainsaw with respect to the longitudinal axis of the elongated support pole. Bailey, in U.S. Pat. No. 3,236,036, and Rishovd, in U.S. Pat. No. 3,237,388, both disclose parallelogram devices for moveably mounting chainsaws or brush cutting saws adjacent the distended ends thereof.

Wroe, in U.S. Pat. No. 3,731,382, discloses an extended chainsaw which includes an elongated support pole interposed between the chainsaw blade and the power producing subsystem. Burch, in U.S. Pat. No. 3,693,676, discloses a power chainsaw which is specifically designed for being submerged beneath the surface of a body of water for cutting pilings and the like adjacent to the bottom thereof. Ibelle, in U.S. Pat. No. 2,810,409, discloses an accessory device for being interposed between an electrically powered or internal combustion engine powered subsystem and a cutting element of the rotary or chainsaw type. It should be noted that this extension does not itself provide for the control of the speed of the cutting element, nor does it provide for the custom orientation of the cutting element with respect to the longitudinal support pole. Smith, in U.S. Pat. No. 3,905,263, discloses an extendible mounting pole for a rotary table saw. These references are typical, but not exhaustive, of those devices typically found in classes 173/170, 310/50, and 173/169 of the United States Patent Classification System.

While the prior art references are useful for extendable utility handles for specific types of powered handtools, they are not suitable either in construction or theory of operation for adaptation and use with a large number of diversified powered handtools. The prior art references neither provide for the required adjustment of the operative angular relationship between the longitudinal axis of the support pole and the effective plane of motion of the powered handtool, nor for the remote control by the operator of the power applied to a large and diversified number of powered handtools which may be each interchangeably coupled at the distended end of the elongated support pole.

Therefore, it is a first object of the present invention to provide an elongated support pole having a first handle adjacent the lower end thereof for providing a support point as well as a first manual control means for controlling the flow of electrical energy to the powered handtool which is interchangeably and moveably coupled to the opposite end of the elongated support pole.

A second object of the present invention is to provide for a simplified positioning device which allows the operator to adjustably control the effective angle included between the electrically powered handtool and the longitudinal axis of the elongated support pole. This positioning may be adjusted by the operator from the lower end of the pole without requiring the release or lowering of the pole from the working position.

A still further object of the present invention is to provide a dual acting safety or dead-man switch which will remove electrical power from the handtool coupled to the distended end of the elongated support pole when the operator releases his supportive grip on either a first handle means or a second handle means provided for supporting the elongated support pole and powered handtool.

SUMMARY OF THE INVENTION

The present invention relates to an adjustable utility extension handle for a small electrically powered handtool. The apparatus includes an elongated support pole having first handle means coupled to a first end thereof for being grasped by the operator to provide a first manual support point. The first handle means includes the first control means operatively interposed along the electrical conductor which supplies electrical energy to the powered handtool for manually regulating the flow of electrical energy therethrough. Tool coupling means are provided for removably coupling with the handtool. The tool coupling means includes actuating means for engaging and fully actuating any electrical power switch or power control which normally regulates the flow of electrical power to the second end of the support pole and to the tool coupling means for regulating the operative relative angular position therebetween. In this manner the operator may set the required operative angular position of the power handtool on the second end of the support pole, and then may electrically control the operation of the power handtool from the first handle means when the power handtool is extended into an operating position.

BRIEF DESCRIPTION OF THE DRAWINGS

Other objects, features and advantages of the present invention will be apparent through a study of the written description and the drawings in which.

DETAILED DESCRIPTION OF THE PREFERRED EMBODIMENT

Figure 1:
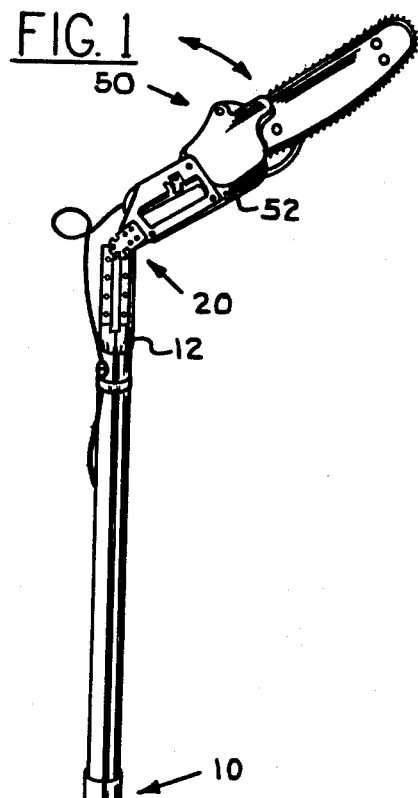
FIG. 1 is a frontal perspective view of a first preferred embodiment of the adjustable utility extension handle having a small, light-weight, electrically powered chainsaw removably coupled to a distended end thereof.

A first preferred embodiment of the present invention is shown generally in FIG. 1. The embodiment includes an elongated support pole 10 having a first end 11 and a second end 12. The support pole 10 may either be a single, long piece of hollow tubing, or in the alternative, the support pole 10 may be constructed of a plurality of shorter lengths of tubing with secured detachable mechanical couplings therebetween. Typically the support pole 10 is at least 4 feet long for use in trimming trees and other elevated vegetation.

Figure 2:
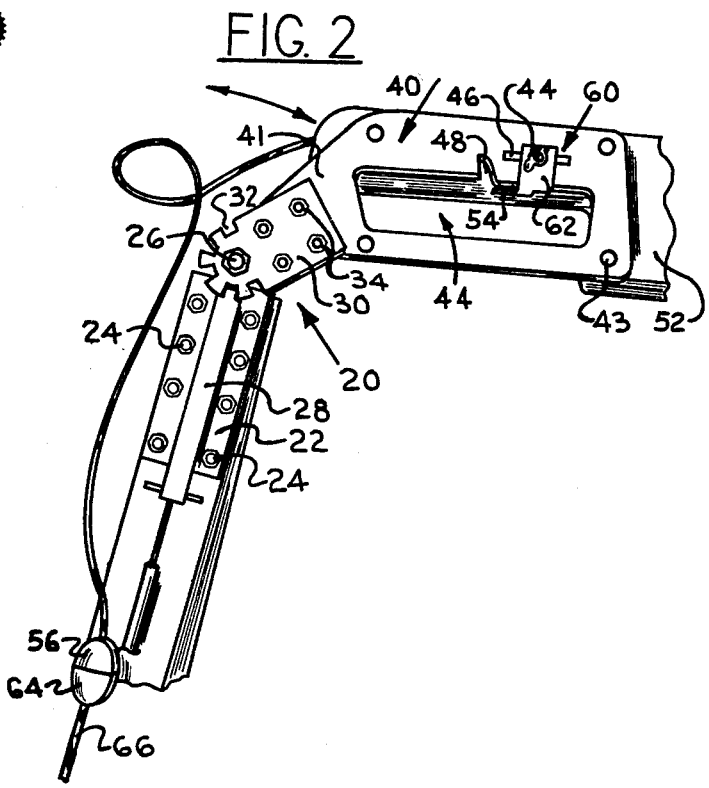
FIG. 2 is a magnified frontal elevation of the positioning device which movably and adjustably regulates the angular orientation between the electrically powered handtool and the longitudinal axis of the elongated support pole.

Positioning means, shown generally as 20 in FIGS. 1 and 2, are coupled to the second end 12 of the support pole 10. The positioning means 20 includes a pole bracket 22 which is coupled by a plurality of nuts and bolts 24 to the flattened second end 12 of the elongated support pole 10. A pivot 26 is movably attached adjacent a distended end of the pole bracket 22 at a point separated from the second end 12 of the pole 10.

A reference plate 30 is movably coupled to the pivot 26 so as to rotate therearound. The semi-circular end of the reference plate 30 adjacent the pivot 26 includes a plurality of apertures or slots 32 therein. These slots 32 are generally equally spaced about the semi-circular circumferential surface of the reference plate and are adapted for receiving therein a movable pin, shown generally as 28, which is movably attached to the pole bracket 22. Typically the movable pin 28 is biased so as to engage one of the slots 32 located in the reference plate 30. In this manner the movable pin 28 will incrementally limit the rotation of reference plate 30 about the pivot axis defined by the pivot 26.

The reference plate 30 is attached by a plurality of nuts and bolts 34 to a first end 41 of a tool coupler 40. A second end 42 of the tool coupler 40 is firmly attached by a plurality of nuts and bolts 43 to the handle 52 of a typical electrically powered handtool, shown generally as 50 in FIG. 1. While the first preferred embodiment of the present invention is shown as being coupled to an electrically powered chainsaw, it must be understood that other small, light-weight, electrically powered handtools may also be interchangeably coupled to the reference plate 30 by an appropriately designed tool coupler 40.

The typical tool coupler 40 will include therein a hand aperture 44 which is generally located to correspond with a similar hand aperture located in the handle 52 of the electrically powered handtool. The shape of this hand aperture 44 is designed so that the operator may continue to utilize the handle section 52 of the electrically powered handtool 50 when the tool coupler 40 is detached from either the reference plate 30 or from the pole bracket 22. To this end the preferred mode of making the handtool 50 detachable from the elongated pole 10 is to provide a quick-detach pivot 26 which may be easily and quickly removed from its mechanical coupling between the pole bracket 22 and the reference bracket 30. In the alternative, the plurality of nuts and bolts 34 may be replaced with quick-detach fasteners which will serve essentially the same purpose. In any event it is important that the operator be capable of quickly attaching and detaching various electrically powered handtools to the present invention in order that it may serve a variety of useful purposes.

An actuating means, shown generally as 60 in FIG. 2, includes a generally L-shaped trigger bracket 62 which is movably coupled by a wingnut and bolt 45 which communicates through a longitudinal slot 46 within the second end 42 of the tool coupler 40. The exact dimensions of the trigger bracket 62 are determined such that the lower or base portion of the trigger bracket 62 will communicate with and depress the trigger element, or other similar electrical switch 54 attached to the handle 52, which is utilized to control the flow of electrical energy to the electrically powered handtool 50. The trigger bracket 62 is generally adjusted for full compression of the trigger 54, and then the wingnut 45 is tightened so that the trigger element 54 generally supplies the maximum flow electrical energy to the handtool 50.

When the operator desires to utilize the powered handtool 50 separately from the present invention, he may loosen the wingnut 45 and rotate the trigger bracket 62 in the clockwise direction so that the base of the bracket 62 will communicate with and be stored within a slot 48 recessed within the tool coupler. In this manner the trigger bracket 62 is stored away from the trigger 54 of the electrically powered handtool 50 to allow easy access to the trigger 54 by the hand of the operator.

In view of the many different varieties of handles 52 on electrically powered handtools 50, it may be necessary to adapt the shape of the tool coupler 40, the location and shape of the hand aperture 44, the size and shape of the trigger bracket 62 as well as the size and location of the slot 48 in order to accommodate these various design parameters. Also, a variety of different methods may be utilized to attach the tool coupler 40 to the handle 52, depending upon the specific construction, characteristics and design requirements.

Returning now to the first preferred embodiment of the present invention, the cutting plane of the electrically powered chainsaw 50 is oriented generally perpendicular to the axis of the pivot 26 in order to minimize any twisting torque moments which may be induced by the operation of the chainsaw 50. While in the case of the first preferred embodiment a total of five slots 32 have been spaced about the circumferential surface of the reference plate 30, a variety of other slot placements and numbers may also be utilized without departing from the spirit or scope of the present invention. In the first preferred embodiment the use of 5 slots allows the electrically powered chainsaw 50 to be oriented generally parallel to the longitudinal axis of the support pole 10, or spaced with a 45° offset in either direction from the support pole 10, or with a 90° offset on either side of the support pole 10. In this manner the optimum downward or upward cutting angle and force may be exerted by the chainsaw 50 when cutting through tree limbs or other similar structures. The specific angle chosen will depend greatly upon the relative height of the article to be cut, the permissible location for the operator, and other clearances surrounding the item to be cut.

An electrical receptacle 64 is provided adjacent the second end 12 of the support pole 10 for receiving therein an electrical plug 56 which is attached to the electrically powered handtool 50 for supplying power thereto. The electrical receptacle 64 is coupled to an electrical conductor 66 which may either run longitudinally down the elongated support pole 10 on the outside thereof, or in the alternative this electrical cable 66 may travel within the hollow section of the support pole 10. Of course, if the electrical cable 66 communicates within the support pole 10, and if a plurality of interconnecting pole sections are utilized, then provisions must be made for both electrical as well as mechanical coupling of the independent pole sections which cooperate to provide the entire length of the support pole 10.

Figure 3:
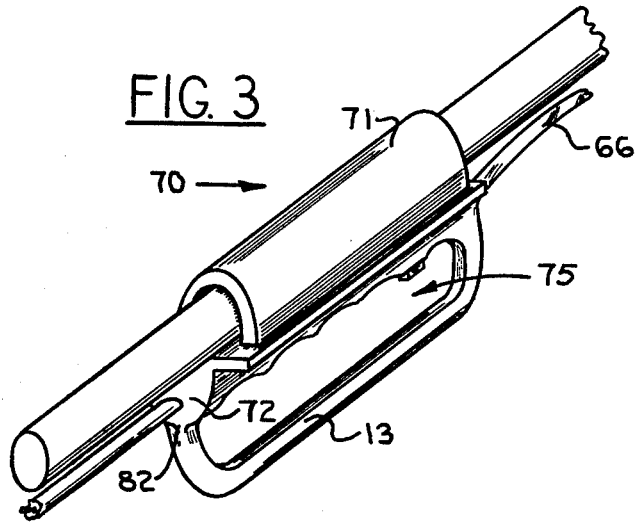
FIG. 3 is a frontal perspective view of a first preferred embodiment of the first handle means in accordance with the teachings of the present invention.

With continuing reference to FIG. 1 and with additional reference to FIG. 3, a first handle 70 is removably coupled to the first end 11 of the elongated support pole 10. This first handle 70 includes an upper circumferential section 71 and a lower circumferential section 72 coupled thereto in order to form a generally cylindrically shaped first handle 70. A lower surface of the circumferential section 72 is corrugated in order to form finger grips 74 for providing a positive coupling between the fingers of the operator and the first handle 70. A lower guard 73 projects downwardly below the handle and defines a hand aperture 75 within the first handle 70. The upper circumferential section 71 and the lower circumferential section 72 are typically fastened together through a plurality of nuts and bolts or other similar fasteners which allow these sections to be loosened for sliding the first handle 70 longitudinally along the support pole 10. An extension may be added to the first end 11 of the elongated pole 10 for communicating with and allowing the ground to support the weight of the apparatus.

The first handle 70 includes in a lower end thereof an electrical power cable 82 for coupling with a source of electrical power. Conductors are provided for coupling the power cable 82 with a trigger assembly 78 which generally comprises a series connected SCR type device for controlling the flow of power between the source of power and the electrically powered handtool 50. Additional electrical cable 66 couples the trigger assembly 78 through an electrical connector 83 with the electrical receptacle 64 adjacent the second end 12 of the support pole 10. Typically, the trigger assembly 78 is biased outwardly, which corresponds to the off or on power flow condition. In this manner the trigger assembly 78 acts as a dead-man type switch for removing power from the electrically power handtool 50 whenever the operator releases his grip upon the first handle 70 and the trigger assembly 78, such as when the operator loses supportive control of the device.

A second handle 80 is movably attached to the elongated support pole 10 between the first end 11 and the second end 12 thereof, and typically is located generally adjacent to but spaced from the first handle 70. This second handle includes two generally upstanding sides 82 which provide support for a grip 84 which runs generally perpendicular to the longitudinal axis of the elongated support pole 10. The lower ends of the second handle 80 are movably coupled and compressed together by the operation of a bolt and wingnut 86, thus allowing the operator to easily move the second handle 80 longitudinally along the support pole 10 to a point which is comfortable for the particular operator involved.

The second handle 80 may also include a second trigger 88, or second manual control means, which is electrically interposed in series along the electrical conductor 66. Typically this second trigger 88 is of the on-off type so that when the operator depresses or squeezes the second trigger 88 power will be supplied through the electrical conductors 66 in order to energize the electrically powered handtool 50. When the operator releases or loses his grip upon the second trigger 88, a biasing force opens the second trigger electrical switch 88 so that electrical power will be removed from the handtool 50. This ensures that the operator is required to utilize both hands to control the motion and operation of the elongated support pole 10.

With reference to FIGS. 1 and 2, an accessory attachment to the first preferred embodiment of the present invention is illustrated as comprising a long mechanical cable 90 having a first end 91 operatively coupled to a lever 94 and a second end 92 which is operatively coupled to the movable pin 28. Using this device the operator may grasp and pull toward him the grip 94, which in turn will tension the insulated mechanical cable 90, which will in turn pull upon the movable pin 28. If the tension supplied by the operator is sufficient, the movable pin 28 will be extracted from within the slot 32 in the reference plate 30, thereby allowing the reference plate 30 as well as the electrically powered handtool 50 to rotate about the pivot 26. In this manner the operator by actuating the grip 94 will be able to adjust the angle included between the electrically powered handtool 50 and the longitudinal axis of the support pole 10 without lowering the device from its elevated or operational position.

The operation of the first preferred embodiment of the adjustable utility extension handle for small electrically powered handtools will now be described with reference to FIGS. 1, 2 and 3. First, the operator selects the electrically powered handtool 50 which is to be utilized for the particular job required. Next, the operator attaches the reference plate 30 which is coupled to the electrically powered handtool 50, to the pole bracket 22 by engaging and attaching the pivot attachment 26. The operator then couples the electrical conductor 56 attached to the electrically powered handtool 50 with the corresponding electrical receptacle 66, and adjusts the actuating means 60 such that the trigger 54 of the handtool 50 is completely depressed for operating the handtool 50 at its maximum speed or power range. The operator may then manually engage the movable pin 28 with the appropriate slot 32 of the reference plate 30 in order to establish the preferred included angle as measured between the handtool 50 and the support pole 10.

The operator then graps the second handle 80, typically with his left hand, and further grasps the first handle 70, typically with his right hand, in order to support and elevate the handtool 50 and the support pole 10 into a generally vertical position. As the operator desires to supply electrical power to the handtool 50, he must first completely depress against the biasing force the second trigger 88, and then he must depress the first trigger 78 in accordance with the flow of power required to operate the power handtool 50. When additional power is required from the handtool 50, the operator needs only to further depress the first trigger assembly 78.

If the operator finds it necessary to adjust the angular position of the handtool 50 while the support pole 10 remains in the vertical position, the operator merely grasps the grip 94 with his left hand and pulls this grip toward him, thereby removing the movable pin 28 from the corresponding slot 32 within the reference plate 30. Typically the operator is resting the handtool 50 against a tree, a limb, a building or other support in order to movably determine the angle included between the handtool 50 and the support pole 10. When the proper angle is determined, the operator releases the biased grip 94 which then allows the movable pin 28 to re-engage with the closest matching slot 32 within the reference plate 30 in order to limit the rotational motion of the handtool 50 about the pivot 26.

Thus, first and alternate preferred embodiments of the apparatus in accordance with the present invention have been illustrated as examples of the invention as claimed. However, the present invention should not be limited in its application to the details illustrated in the accompanying drawings of the specification, since this invention may be practiced and constructed in a variety of other different embodiments. Also, it must be understood that the terminology and descriptions employed herein are used solely for the purpose of describing the general operation of the preferred embodiment, and therefore should not be construed as limitations on the operability or future improvements upon the present invention.

I claim:

1. An adjustable utility extension handle for a small electrically powered handtool, said extension handle comprising in combination:

an elongated support pole having a first end and a second end;

first handle means coupled to said support pole adjacent said first end thereof for being grasped by the operator to provide a first manual support point, said first handle means including first manual control means operatively interposed along an electrical conductor which supplies electrical energy to the power handtool, said manual control means for regulating the flow of electrical energy therethrough; tool coupling means for coupling with the power handtool, said coupling means further including actuating means for engaging and actuating any electrical power control regulating the power handtool; and positioning means including a pivot operatively interposed between said second end of said support pole and said tool coupling means for defining a pivot axis which limits relative motion therebetween, a reference plate coupled to said pivot and having a plurality of apertures therein, and a pin for operatively engaging one of said apertures in said reference plate, with said reference plate and said pin being operatively interposed between said second end of said support pole and said tool coupling means for controllably limiting the angular motion of the power handtool about said pivot, whereby the operator may set the required operative angular position of the power handtool adjacent the second end of said support pole and then may electrically control the operation of the power handtool from said first handle means when the power handtool is elevated into an extended operating position.

2. The utility extension handle as described in claim 1 wherein:

said reference plate is coupled to said tool coupling means and to said pivot with said apertures arranged circumferentially about said pivot; and wherein said pin is movably coupled adjacent said second end of said support pole for adjustably engaging a selected one of said apertures within said reference plate, thereby securing the incremental angular rotation of said reference plate about said pivot.

3. The utility extension handle as described in claim 1 further including remote locking means attached to said support pole adjacent said first handle and operatively coupled to said pin for controllably disengaging and engaging said pin from said apertures for remotely adjusting the position of the power handtool.

4. The utility extension handle as described in claim 3 wherein said power handtool comprises an electrically powered chainsaw defining a cutting plane generally perpendicular to said pivot.

5. An adjustable utility extension handle for a small electrically powered chain saw, said extension handle comprising in combination:

an elongated support pole having a first end and a second end:

first handle means coupled to said support pole adjacent said first end thereof for being grasped by the operator to provide a first manual support point, said first handle means including first manual control means operatively interposed along an electrical conductor which supplies electrical energy to the chainsaw, said manual control means for regulating the flow of electrical energy therethrough; tool coupling means for coupling with the chain saw and for actuating any electrical power control regulating the speed of the chainsaw; and a pivot operatively interposed between said second end of said suppport pole and said tool coupling means for defining a pivot axis perpendicular to a cutting plane of the chain saw;

a reference plate coupled to said pivot and having a plurality of apertures therein; and a pin for operatively engaging one of said apertures in said reference plate, with said reference plate and said pin being operatively interposed between said second end of said support pole and said tool coupling means for controllably limiting the angular motion of the chain saw about said pivot, whereby the operator may set the required operative angular position of the chain saw adjacent said second end of said support pole and then may electrically control the operation of the chain saw from said first handle means when the chain saw is elevated into an extended operating position.

6. The utility extension handle as described in claim 5 wherein said elongated support pole comprises a plurality of interchangeable sections coupled longitudinally so as to form said elongated support pole.

7. The utility extension handle as described in claim 6 wherein said electrical conductor communicates longitudinally within said elongated support pole, with adjacent ones of said interchangeable sections including at the distended ends thereof electrical connectors coupled to said electrical conductor for operatively mating with said electrical connectors in adjacent ones of said interchangeable sections of said elongated support pole.

8. The utility extension handle as described in claim 5 wherein said first manual control means is biased off so as to prevent the flow of electrical energy therethrough in the absence of continuous manual pressure thereon, whereby said first manual control means acts as a deadman switch for removing power from said powered handtool responsive to the loss of manual pressure thereon.

9. The utility extension handle as described in claim 8 wherein said first manual control means is continuously variable for allowing the operator to accurately control the speed of said powered handtool.

10. The utility extension handle as described in claim 8 wherein said actuating means comprises a bracket having a first end adapted for communicating with the electrical power control on the handtool, said bracket having another section thereof movably coupled to said tool coupling means for controlling extent of the depression of the power control, with said tool coupling means also including a slot for removably receiving said first end of said bracket therein, whereby said actuating means may be controllably disengaged from the electrical power control so that the electrical handtool can be operated manually.

11. The utility extension handle as described in claim 8 further comprising second handle means movably coupled along said support pole intermediate said second end thereof and said first handle means, with said second handle means including interlock means operatively interposed along said electrical conductor for preventing the flow of electrical energy therethrough responsive to the absence of manual pressure on said second handle means, thereby disabling the power handtool when the operator loses or releases manual pressure on said second handle means.

12. An adjustable utility extension handle for a small electrically powered chain saw, said extension handle comprising in combination:

an elongated support pole having a first end and a second end:

first handle means coupled to said support pole adjacent said first end thereof for being grasped by the operator to provide a first manual support point, said first handle means including first manual control means operatively interposed along an electrical conductor which supplies electrical energy to the chainsaw, said manual control means for regulating the flow of electrical energy therethrough;

tool coupling means for coupling with the chain saw and for actuating any electrical power control regulating the speed of the chainsaw;

a pivot operatively coupled between said second end of said support pole and said tool coupling means, with said pivot being oriented generally perpendicular to said second end of said support pole and generally perpendicular to a cutting plane defined by the chain saw so as to allow the elongated support pole to move only parallel to the cutting plane of the chain saw; and means for locking the position of the chain saw relative to said support pole during operation, whereby the operator may set the required operative angular position of the chain saw adjacent said second end of said support pole and then may electrically control the operation of the chain saw from said first handle means when the chain saw is elevated into an extended operating position.

* * * * *